UNITED STATES PATENT OFFICE.

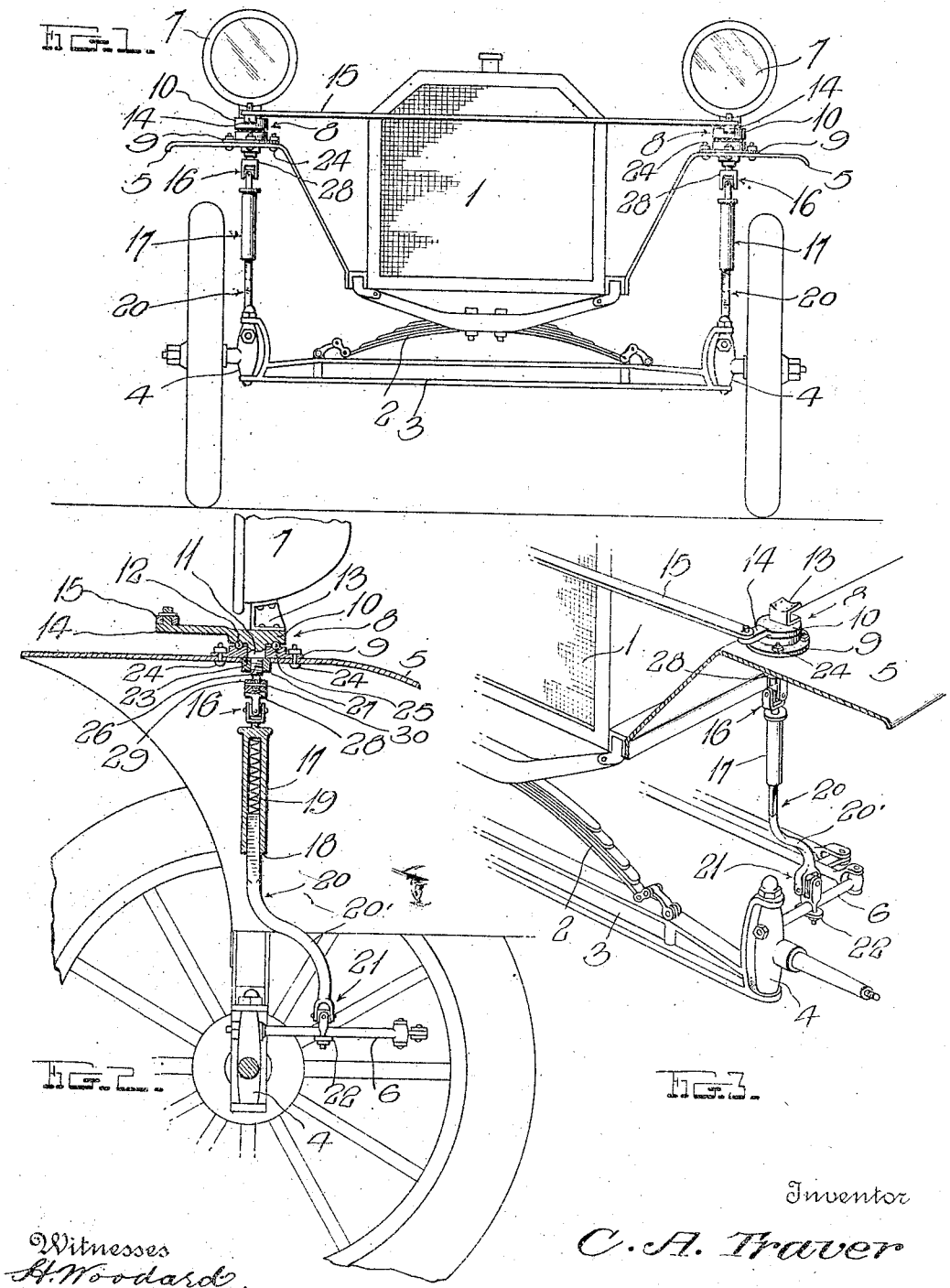

CHARLIE A. TRAVER, OF WICHITA, KANSAS.

DIRIGIBLE HEADLIGHT FOR AUTOMOBILES.

1,200,544.

Specification of Letters Patent. Patented Oct. 10, 1916.

Application filed October 21, 1915. Serial No. 57,083.

*To all whom it may concern:*

Be it known that I, CHARLIE A. TRAVER, a citizen of the United States, residing at Wichita, in the county of Sedgwick and State of Kansas, have invented certain new and useful Improvements in Dirigible Headlights for Automobiles; and I do declare the following to be a full, clear, and exact description of the invention, such as will enable others skilled in the art to which it appertains to make and use the same.

This invention relates to new and useful improvements in headlights or lamps for vehicles, and one object of the invention is to provide a device of this general character having novel and approved means for projecting the rays of light from the headlights or lamps in the direction of the line of travel of the vehicle.

Another object of this invention is to provide means for absorbing all the shocks due to any unevenness of the surface over which the vehicle may travel, which may be transmitted to the headlight.

A further object of the invention is to provide a device of this character which is simple and durable in construction, inexpensive to manufacture and which will be very efficient in operation.

With these and numerous other objects in view my invention consists of the novel features of construction, combination and arrangement of parts which will be herein referred to and more particularly pointed out in the specification and claim.

In the accompanying drawings: Figure 1 is a front elevation showing my invention applied to an automobile; Fig. 2 is a vertical longitudinal section, and Fig. 3 is a perspective.

In describing my invention I shall refer to the drawings in which similar reference characters designate corresponding parts throughout the several views and in which throughout Fig. 1 is shown my invention applied to the headlight of an automobile. The parts of the automobile shown in Fig. 1 which is the front view of the same consist of a radiator 1, spring 2, axle 3 having knuckles 4 on either end of the same, and the usual type of guard 5 used in vehicles of this character. Projecting rearwardly from the knuckles 4 near the end of the axle 3 are the steering arms 6 which are of the usual type incidental to vehicles of this character.

The headlights or lamps of the vehicle which are designated by the numeral 7, are positioned above the upper surface of the guards 5, the said guards having apertures therein disposed in vertical alinement with the knuckle 4 for a purpose to be hereinafter more fully described. These lamps 7 are swingingly mounted above the guards 5 by means of a thrust bearing 8, which consists of a substantially circular base portion 9, having an aperture 23 centrally disposed therethrough, and securely fastened to the upper surface of the guards 5 by means of fastening members 24 as clearly shown in Fig. 2 of the drawings. When these base portions 9 are securely fastened in position as above described the centrally disposed apertures 23 in the same will aline with the apertures in the said guards, so that the movable portion of the bearing 8, which is designated by the numeral 10 may be positioned above the same, and the said removable portion 10 has a downwardly projecting lug 11 that extends through the alining openings to a point below the under surface of the guards. The upper and lower faces of these portions 9 and 10 are disposed adjacent each other and said faces have disposed therein a race 25, which is substantially circular and is formed of a semi-circular groove in the opposite faces of the same. This race 25 has disposed therein a plurality of bearings 12, so that when the parts are in position, the movable portion 10 may be easily turned with respect to the stationary base portion 9.

Secured to the upper surface of the movable portion 10 of the thrust bearing 8 are supporting brackets 13, that are secured to the lower portion of the lamp 7 so that the said lamp will be supported on the movable portions whereby upon any movement of the same the lamp will be turned accordingly. The downwardly projecting lug 11 that extends through the alining apertures in the guards 5 in the base portion 9 has its projecting lower end screw threaded as shown at 26 and has disposed thereon a locking nut 27. This locking nut 27 prevents any upward movement of the movable portion 10, so that lug 11 will not be apt to be withdrawn from the aperture in the base portion. The lower portion 26 of the downwardly projecting lug 11 has its extremity contracted as shown at 28, and disposed in a socket 29, the same being securely held in engagement therewith by means of a transversely extending pin 30 that is adapted to hold the parts in locked position. It will be understood that the guards 5 of this machine will be provided with this type of thrust bearing 8 at either side of the same, and at a point directly above the knuckles 4 at either end of the axle 3. Projecting forwardly from the movable portion 10 of the bearings 8 are arms 14, which have their outer ends connected by a link member 15, so that upon movement of one of the movable portions 10 the other will be caused by this means to turn simultaneously therewith.

The lower end of the socket 29 has formed thereon one section of a universal joint 16 and the other section of the same being formed in the top of a vertically disposed tubular member 17. By this means the tubular member 17 is vertically disposed in alinement with the downwardly projecting lug 11, and the said member 17 depends by the universal joint from its lower end. This tubular member 17 has its lower end 18 open, and has disposed in its tubular portion a coiled spring 19 which will act as an antirattler when the device is in operation. The tubular member 17 is substantially rectangular shape in cross section and the open lower end 18 of the same is adapted to receive therein a correspondingly shaped crank 20, which is curved intermediate its ends as shown at 20' and has its lower end connected by means of a universal joint 21 to the steering arm 6. This connection of the steering arm 6 is brought about by means of a clamp 22, which is adapted to hold the other portion of the universal joint 21 whereby the same is connected with the crank 19.

It will be obvious by this construction there will be formed a connection between the lamp supporting bearing 8, and the steering arm 6 of the vehicle. This connection, owing to the fact that the same has in its length two universal joints, will be in the nature of a flexible link, and owing to the slidable connection between the two parts of the said connection the cushioning movement, which is very essential to devices of this character, will be brought into effect. In operation when the parts of this device are assembled as shown in Fig. 1 of the drawing any movement of the front wheels of this vehicle in either direction will of course cause the steering arm 6 to move likewise. This movement of the steering arm 6 will move the crank 19, and hence the tubular member 17 will be turned, whereby the rotary motion of the same will be transmitted to the movable portion 10 of the lamp support bearing 8, and as the lamp 7 is supported on this part, consequently the lamp will be turned in the desired direction. Owing to the flexible link 15 which connects the two lamps, it is only necessary to make this connection at one side of the vehicle, as upon turning of one of the lamps the other will move simultaneously therewith. This connection forms an easy and simple means for turning the lamps of an automobile or light vehicle simultaneously with movements of the front wheels, and owing to its construction, this device may be applied to any desired type of vehicle.

From the foregoing description of the construction of my improved device the manner of applying the same to use and the operation thereof will be readily understood and it will be seen that I have provided a simple, inexpensive and efficient means for carrying out the objects of the invention.

I claim as my invention:

The combination with an automobile having a mud guard, a bearing thereon, a steering knuckle with an arm projecting rearwardly therefrom, of a clamp on said arm, a crank having a vertical upper end disposed in vertical alinement above the steering knuckle, a universal connection between the lower end of said crank and the clamp on the steering arm, a rotatable plate supporting a lamp mounted on the bearing on said guard, a depending lug from the plate projecting through the guard, a tubular member having its lower end slidably but non-rotatably connected with the upper end of said crank, and a universal connection between the upper end of said member and the lower end of the depending lug.

In testimony whereof I have hereunto set my hand in presence of two subscribing witnesses.

CHARLIE A. TRAVER.

Witnesses:
 JESSE B. CARR,
 R. R. ROTH.